(12) United States Patent
Robles et al.

(10) Patent No.: US 8,676,260 B2
(45) Date of Patent: Mar. 18, 2014

(54) METHOD OF MANAGING INFORMATION BY A LARGE CAPACITY UICC

(75) Inventors: Javier Cañis Robles, Madrid (ES); Antonio Manuel Lopez, Madrid (ES)

(73) Assignee: Microelectronica Espanola S.A.U., Madrid (ES)

( * ) Notice: Subject to any disclaimer, the term of this patent is extended or adjusted under 35 U.S.C. 154(b) by 606 days.

(21) Appl. No.: 12/308,799

(22) PCT Filed: Dec. 28, 2007

(86) PCT No.: PCT/ES2007/000774
§ 371 (c)(1),
(2), (4) Date: Apr. 30, 2010

(87) PCT Pub. No.: WO2009/083618
PCT Pub. Date: Jul. 9, 2009

(65) Prior Publication Data
US 2010/0255819 A1    Oct. 7, 2010

(51) Int. Cl.
*H04B 1/38* (2006.01)
*H04M 3/00* (2006.01)

(52) U.S. Cl.
USPC .......................................... 455/558; 455/419

(58) Field of Classification Search
USPC ................................................. 455/558, 419
See application file for complete search history.

(56) References Cited

U.S. PATENT DOCUMENTS

| | | | |
|---|---|---|---|
| 2003/0163570 A1* | 8/2003 | Hendley et al. | 709/227 |
| 2006/0079284 A1 | 4/2006 | Lu et al. | |
| 2010/0255819 A1* | 10/2010 | Robles et al. | 455/414.1 |

FOREIGN PATENT DOCUMENTS

| | | |
|---|---|---|
| EP | 1737194 A1 | 12/2006 |
| EP | 1860840 A2 | 11/2007 |

OTHER PUBLICATIONS

"Smart Cards; Application invocation Application Programming Interface (API) by a UICC webserver for Java Card™ platform; (Release 7); ETSI TS 102 588", ETSI Standards, Lis, Sophia Antipolis Cedex, France, vol. SCP-T, No. V7.1.0, Jul. 1, 2007, pp. 1-12.

Urien, "Internet card, a smart card as a true Internet node", Computer Communications, Elsevier Science Publishers BV, Amsterdam, NL, vol. 23, No. 17, Nov. 1, 2000, pp. 1655-1666.

"Universal Mobile Telecommunications System (UMTS); Secured packet structure for (Universal) Subscriber Identity Module (U)SIM Toolkit applications (3GPP TS 31.115 version 7.1.0 Release 7), ETSI TS 131 115", ETSI Standards, Lis, Sophia Antipolis Cedex, France, vol. 3-T6; 3-CT6, No. V7.1.0, Jun. 1, 2007, pp. 1-19.

(Continued)

*Primary Examiner* — Marisol Figueroa
(74) *Attorney, Agent, or Firm* — Katten Muchin Rosenman LLP

(57) ABSTRACT

A method of exchanging information comprising dynamic contents through an interne type network between a large capacity universal integrated circuit card located within a mobile equipment and a remote device, said large capacity universal integrated circuit card comprising a smart card web server and having at least one servlet installed, wherein said smart card web server is configured for managing and controlling the execution of said servlet. It comprises the following steps: said servlet installed in said large capacity universal integrated circuit card implements a functionality of remote application management and processes commands configured for being used by said functionality of remote application management; exchanging said commands between said large capacity universal integrated circuit card and said remote device using an http-type protocol layer.

15 Claims, 8 Drawing Sheets

(56) References Cited

OTHER PUBLICATIONS

"Digital cellular telecommunications system (Phase 2+); Universal Mobile Telecommunications System (UMTS); Remote APDU Structure for (Universal) Subscriber Identity Module (U)SIM Toolkit applications (3GPP TS 31.116 version 7.0.0 Release 7), ETSI TS 131 116"; ETSI Standards, Lis, Sophia Antipolis Cedex, France, vol. 3-T6; 3-CT6, No. V7.0.0, Jun. 1, 2007, pp. 1-11.

"Smart Cards; Remote APDU structure for UICC based applications (Release 7), ETSI TS 102 226", ETSI Standards, Lis, Sophia Antipolis Cedex, France, vol. SCP, No. V7.5.0, Oct. 1, 2007, pp. 1-33.

International Search Report for PCT/ES2007/000774, 4 pages, Aug. 28, 2009.

ETSI TS 131 115 V7.1.0 (Jun. 2007), Technical Specification, Universal Mobile Telecommunications System (UMTS); Secured packet structure for (Universal) Subscriber Identity Module (U)SIM Toolkit applications (3GPP TS 31.115 version 7.1.0 Release 7).

ETSI TS 131 116 V7.0.0 (Jun. 2007), Technical Specification, Digital cellular telecommunications system (Phase 2+); Universal Mobile Telecommunications System (UMTS); Remote APDU Structure for (Universal) Subscriber Identity Module (U)SIM Toolkit applications (3GPP TS 31.116 version 7.0.0 Release 7).

ETSI TS 102-221 V7.9.0 (Jul. 2007), Technical Specification, Smart Cards; UICC-Terminal interface; Physical and logical characteristics (Release 7).

ETSI TS 102-225 V7.3.0 (Apr. 2006), Technical Specification, Smart Cards; Secured packet structure for UICC based applications (Release 7).

ETSI TS 102-226 V7.5.0 (Oct. 2007), Technical Specification, Smart Cards; Remote APDU structure for UICC based applications (Release 7).

\* cited by examiner

METHOD OF MANAGING INFORMATION BY A LARGE CAPACITY UICC

FIELD OF THE INVENTION

The present invention is related to the field of mobile communications and, more particularly, to mobile communications which use a smart card for exchanging information with a remote device through an Internet-type network.

STATE OF THE ART

In the context of the present disclosure, the following terms and expressions can be interpreted as set forth below:

Smart card, chip card or integrated circuit card (ICC): is defined as any pocket-sized card with embedded integrated circuits which can process information.

UICC (Universal Integrated Circuit Card): is the smart card, chip card or integrated circuit card used in mobile terminals in GSM and UMTS networks. In a GSM network, the UICC contains a SIM application and in a UMTS network it is the USIM application. A UICC may contain several applications, making it possible for the same smartcard to give access to both GSM and UMTS networks, and also provide storage of a phone book and other applications. It is also possible to access a GSM network using an USIM application and it is possible to access UMTS networks using a SIM application with mobile terminals prepared for this.

SIM (Subscriber Identity Module): is part of a removable smart card or ICC (Integrated Circuit Card), also known as SIM Card, for mobile cellular telephony devices such as mobile computers and mobile phones. It is managed by a GSM mobile network operator (MNO) and comprises a module for identifying a subscriber who accesses a mobile communications network (MNO). It is also capable of storing subscriber information, such as its agenda or text messages.

USIM (Universal Subscriber Identity Module: An application for UMTS mobile telephony running on a UICC (Universal Integrated Circuit Card), also known as USIM Card, which is inserted in a 3G mobile phone.

MegaSIM Card: Large capacity Universal Integrated Circuit Card (UICC). In other words, it is a SIM Card or USIM Card which additionally comprises a large amount of storing capacity (i.e. more than 128 MBytes), typically flash memory, which allows the subscriber and the MNO to store a large amount of information, such as video or images. A large capacity Universal Integrated Circuit Card (UICC) or MegaSIM Card usually comprises a high-speed communications interface, such as USB but not limited thereto, which allows offering services which imply a large exchange of information. MegaSIM is a registered term (MegaSIM™) by MSYSTEMS LTD., Kefar Saba, Israel.

Smart Card Web Server (SCWS): Web server placed in a MegaSIM card.

Card Application Runtime Environment (CAT-RE): Entity integrated in the Operative System (OS) of a large capacity Universal Integrated Circuit Card (UICC) or MegaSIM card, which is in charge of managing and controlling the execution of Toolkit applications.

Remote Application Management (RAM): Toolkit application controlled by the CAT-RE, in charge of managing the large capacity Universal Integrated Circuit Card (UICC) or MegaSIM card in relation to the installation of new applications, management of the current applications' status and management of the status of the card itself.

USB Inter chip (USB-IC): Electrical interface between the USB of a large capacity Universal Integrated Circuit Card (UICC) or MegaSIM and the device supporting said USB of the large capacity Universal Integrated Circuit Card (UICC) or MegaSIM. This interface is an adaptation of the interface USB 2.0 designed for short-distance communications. It only refers to electrical parameters.

http: Protocol used for the transfer of web pages.

https: http protocol which includes ciphering based on the Secure Socket Layers (SSL) in order to create a ciphered channel, which is more appropriate than http for the transfer of sensitive information (information which requires a certain level of security).

TCP-IP: Network protocol on which Internet is based and which allows data transmission between computer networks.

Servlet: Is an object that receives a request and generates a response based on that request. The basic servlet package defines Java objects to represent servlet requests and responses, as well as objects to reflect the servlet's configuration parameters and execution environment.

Last generation smart cards have the possibility of including a Web server capable of serving static or dynamic web pages to Internet browsers located within the mobile terminal in which the smart card is located or to Internet browsers located within a remote device having Internet access. This service is called Smart Card Web Server (SCWS).

The SCWS is feasible thanks to the recent evolution of the smart card, since there has been a significant improvement in its communications interfaces, communications protocols and storage capacity.

FIG. 1 shows the well-known architecture of the SCWS and the different communications protocols used in order to serve Internet browsers. As already explained, the new generation SIM cards or USIM cards allowing this service are called large capacity Universal Integrated Circuit Card (UICC) or MegaSIM cards.

FIG. 1 shows how a SCWS 148 is supported on the protocol stack of the large capacity Universal Integrated Circuit Card (UICC) 120.

In FIG. 1 three physical entities are represented: a mobile equipment or mobile terminal 122, a MegaSIM card or large capacity Universal Integrated Circuit Card (UICC) 120 located within said mobile equipment 122 and a remote device 124 configured for exchanging information with said large capacity Universal Integrated Circuit Card (UICC) 120 through the Internet 121. The large capacity UICC 120 comprises at least a high-capacity memory 156, such as a flash memory.

In order for the large capacity UICC 120 to communicate with an Internet browser 152 located within the mobile equipment 122, a protocol stack comprising an http or https layer 142 mounted over a TCP-IP layer 136 in turn supported by a high speed protocol, such as USB-IC interface, 130 is used. The high speed protocol represented in FIG. 1 is USB-IC. The SCWS 148 is mounted over said http or https layer 142. Similarly, at the mobile equipment 122, said Internet browser 152 is supported by a http layer 144 mounted over a TCP-IP layer 138 in turn supported by a high speed protocol, such as a USB-IC interface 132.

Thus, when required by a user, the Internet browser 152 performs http requests 126 to the SCWS 148 in order to download web pages. These contents (web pages) are stored and managed at a high-capacity memory 156 within the large capacity UICC 120. Such contents managed by the SCWS 148 can be either static, thus being stored in the high-capacity memory 156, or dynamic. The dynamic contents are obtained through the execution of applications or Servlets 150 which manage the requests and generate those contents depending on external parameters. The management and execution control of the Servlets 150 is done by the SCWS 148.

FIG. 1 also shows how an Internet browser 154 located within an external device 124 can access the services offered by the SCWS 148 of the large capacity UICC 120. This communication is established through the Internet 130. The Internet browser 154 is supported by protocol http 146, which is in turn supported by a TCP-IP layer 140. In this case, the mobile equipment 122 which locates the large capacity UICC 120 acts as Proxy 134, being thus capable of routing the TCT-IP frames over the high speed protocol, such as a USB-IC 134, towards the large capacity UICC 120. The mobile equipment 122 also acts as Proxy 134 in the opposite exchange of information (i.e. from the large capacity UICC 122 towards the remote device 124).

The SCWS 148 comprises three different entities: an http and https engine as defined in the Open Mobile Alliance (OMA) "OMA Smart Card Web Server", a communications protocol as defined by the European Telecommunications Standards Institute (ETSI) standards ETSI TS 102 600" and "ETSI TS 102 223", and a Servlet functionality as defined by ETSI standard "ETSI TS 102 588".

On the other hand, the large capacity UICC comprises a multi-application platform in which different applications can co-exist, allowing the large capacity UICC to become a device offering a plurality of services and having the possibility of adding new services during its lifetime.

The entity in charge of controlling and managing the applications offered by the large capacity UICC is called Card Manager. Besides, this entity manages the status of the large capacity UICC and of its applications, as well as its privileges.

Once the large capacity UICC is provided to a final user and inserted in a mobile equipment, the entity called Card Manager is not reachable any more, due mainly to the fact that the mobile equipment does not provide the applications, either those located within the device or the remote ones, with any mechanism of communication with the Card Manager. This is due to the fact the communication with the Card Manager must be done through a basic logical channel. When the mobile equipment or terminal starts a session, it communicates with a default GSM (or USIM) application through a basic channel. Therefore, no other application can select the Card Manager in that basic channel.

In order to solve this problem of visibility of the Card Manager, there exists a Toolkit application to which the Card Manager delegates and which allows to carry out many of the tasks for which the Card Manager is responsible. This Toolkit application provides the extra advantage that these activities can be carried out during the whole life of the large capacity UICC and with different communications protocols supported by mobile equipments. This Toolkit application is called Remote Application Management (RAM) and is defined by ETSI standards "ETSI TS 102 226" and "ETSI TS 131 116".

FIG. 2 shows how the RAM 292 is supported on the protocol stack of a large capacity UICC 220 and how it communicates with an application 210 located within an operation center 274 of a Mobile Network Operator (MNO). In FIG. 2 the different entities and protocol layers involved are shown.

In FIG. 2 three physical entities are represented: a mobile equipment or mobile terminal 222, a large capacity UICC 220 located within said mobile equipment 222 and an operation center 274 of a Mobile Network Operator (MNO). The operation center 274 is configured for exchanging information with said large capacity UICC 220 through the MNO network 276.

An entity 280 within the Universal Integrated Circuit Card (UICC) 220 implements the protocol layers "ISO 7816" "ETSI TS 102 221" "3GPP TS 31.102" 282, which define the physical communication 212 with the corresponding protocol layers "ISO 7816" "ETSI TS 102 221" "3GPP TS 31.102" 298 of the mobile equipment 222 within which the large capacity UICC 220 is located.

An entity called CAT-RE 284 within the large capacity UICC 220 implements the protocols layer "ETSI TS 102 223" "ETSI TS 102 241" "3GPP TS 31.111" and "ETSI TS 131 130" 286, which communicates with the corresponding protocols layer "ETSI TS 102 223" "ETSI TS 102 241" "3GPP TS 31.111" and "ETSI TS 131 130" 260 of the mobile equipment 222 within which the large capacity UICC 220 is located. This layer defines the protocol which allows the communication of the Toolkit applications which can be found in the large capacity UICC 220 with external or remote applications and devices.

The physical communication 214 between the mobile equipment 222 and the operation center 274 is implemented by means of layer "ETSI TS 123 040" 262 264, present at both devices 222 274. This layer defines the structure of short messages "sms", which are exchanged between both devices 274 222 through a sms serving center 278, located within the MNO network 276.

An entity called OTA (Over-The-Air) 288 within the large capacity UICC 220 implements the protocols layer "ETSI TS 102 225" and "ETSI TS 131 115" 290, which defines a protocol which allows applying security to the frames, providing confidentiality, authentication and sequence control to said frames. At the operation center 274, this layer "ETSI TS 102 225" and "ETSI TS 131 115" 266 is supported on the already mentioned layer "ETSI TS 123 040" 264.

Finally, an entity called RAM 292 within the large capacity UICC 220 implements the upper layer "Global Platform ETSI TS 102 226" and "ETSI TS 131 116" 294. At the operation center 274, this layer Global Platform "ETSI TS 102 226" and "ETSI TS 131 116" 268 is supported by the already mentioned layer "ETSI TS 102 225" and "ETSI TS 131 115" 266. This layer 268 allows an application 270 present at the operation center 274 to manage and control the large capacity UICC 222 through the RAM 292. Layer 268 defines the application commands which allow the card management, that is to say, the command which the RAM is capable of interpreting. Among the different tasks supported at this last layer, the following can be mentioned: loading and installing new applications, deleting applications, getting the status and characteristics of the applications, modifying its status and obtaining the large capacity UICC status and its modification.

FIG. 3 shows a frame 301 of a possible command received by a large capacity UICC 320 of FIG. 2 and which is addressed to a RAM Toolkit application. FIG. 3 shows APDUs (Application Protocol Data Unit) which are exchanged as required by ISO 7816-4. In this frame 301 the different protocol layers can be observed:

Reference 382*a* refers to the ETSI TS 102 221 layer, which comprises an APDU envelope Data Download. This is also represented by reference 382*b*.

A layer 123 040 referred to as 483*a* is encapsulated within said APDU. This is also represented by reference 383*b*. This layer 383*a* 383*b* is formed by a TLV SMS_TPDU. In turn, within this SMS_TPDU, an ETSI layer 131 115 is encapsulated. This ETSI layer 131 115 is referred to as 390*a* and 390*b*. This layer comprises a Command packet, in which its secured data comprises a Global Platform layer 394*a* 394*b*. This secured data which forms the Global Platform layer are the actual commands which are processed by the RAM Toolkit application.

FIG. 3 also shows a frame 302 generated by the large capacity UICC 220 of FIG. 2.

In this frame 302 the different protocol layers can be observed:

Reference 351a refers to an ETSI TS 102 223 layer, which defines a proactive command "Send Short Message". This is also represented by reference 351b. A layer 123 040 referred to as 385a is encapsulated within said proactive command "Send Short Message". This is also represented by reference 385b. An ETSI layer 131 115 referred to as 391a is encapsulated within the former one 385a 385b. This is also represented by reference 391b. This layer 391a 391b is formed by a Response Packet which provides security. Finally, Global Platform layer 395a is encapsulated. This layer 395a comprises de RAM reply. This is also represented by reference 395b.

FIG. 4 shows another existing architecture of the SCWS and the different communications protocols used in order to serve Internet browsers. This architecture is based on the Bearer Independent Protocol (BIP), which is a mechanism, defined in "ETSI TS 102 223", by which a mobile equipment 422 provides to the SIM card, USIM card or large capacity UICC 420 located within it access to the data bearers supported by the mobile equipment 422 (e.g. Bluetooth, IrDA, etc.) and the network (e.g. GPRS, 3G, etc.). Therefore, the BIP protocol enables the SIM card, USIM card or large capacity UICC to communicate with external entities over standardized protocols like TCP/IP. As illustrated in FIG. 4, BIP protocol runs over ISO 7816.

FIG. 4 shows how a local 452 or remote 454 web browser establishes a communication with the SCWS 448 via the BIP protocol and how the SCWS 448 is supported on the protocol stack of the large capacity Universal Integrated Circuit Card (UICC) 420.

Like in FIG. 1, in FIG. 4 three physical entities are represented: a mobile equipment or mobile terminal 422, a MegaSIM card or large capacity Universal Integrated Circuit Card (UICC) 420 located within said mobile equipment 422 and a remote device 424 configured for exchanging information with said large capacity Universal Integrated Circuit Card (UICC) 420 through the Internet 421.

If the large capacity Universal Integrated Circuit Card (UICC) 420 wants to establish a TCT/IP communication with an external entity, such as the mobile equipment 422, a Bearer Independent Protocol (BIP) gateway 434 located within this mobile equipment 422 is needed. Basically, this BIP gateway 434 is used as a protocol converter. In the mobile equipment 422, the TCP/IP protocol 438 is used between the http application 444 and the BIP gateway 434, the BIP protocol being used between the BIP gateway 434 and the large capacity Universal Integrated Circuit Card (UICC) 420.

Thus, in order for the large capacity UICC 420 located within a mobile equipment 422 to communicate with an Internet browser 452 located within the mobile equipment 422, a protocol stack comprising an http or https layer 442 mounted over an entity 486 which implements the protocols layer "ETSI TS 102 223" "ETSI TS 102 241" "3GPP TS 31.111" and "ETSI TS 131 130" is used. They communicate with the corresponding protocols layer 460 "ETSI TS 102 223" "ETSI TS 102 241" "3GPP TS 31.111" and "ETSI TS 131 130" of the mobile equipment 422 within which the large capacity UICC 420 is located. This layer defines the protocol which allows the communication of the Toolkit applications which can be found in the large capacity UICC 420 with external or remote applications and devices. This layer lays over an entity 480 498 which supports ISO 7816, ETSI TS 102 221 and 3GPP TS 31.102.

The browser 452 uses the TCP/IP protocol 438 and treats the SCWS like another application in the mobile equipment 422 with its IP address and its port. The TCP/IP stack usually associates the loop-back address (127.0.0.1) with the SIM card, USIM card or large capacity Universal Integrated Circuit Card (UICC) 420; therefore, all the received data in the TCP/IP stack which are to be delivered to the loop-back address are translated to the BIP Protocol and sent to the large capacity Universal Integrated Circuit Card (UICC) 420.

At the large capacity Universal Integrated Circuit Card (UICC) 420, this UICC 420 uses the BIP Protocol 486 to get the data. In this case, the data are formatted according to the http or https protocol 442 and then delivered to the SCWS 448, which is configured for triggering any Servlet 450 to process the incoming http command.

Thus, when required by a user, the Internet browser 452 performs http requests to the SCWS 448 in order to download web pages. These contents (web pages) are stored and managed at a high-capacity memory within the large capacity UICC 420. The dynamic contents are obtained through the execution of applications or Servlets 450 which manage the requests and generate those contents depending on external parameters.

FIG. 4 also shows how an Internet browser 454 located within an external device 424 can access the services offered by the SCWS 448 of the large capacity UICC 420. This communication is established through the Internet 421. The Internet browser 454 is supported by protocol http 446, in turn supported by a TCP-IP layer 440.

However, the mentioned Toolkit application RAM has several disadvantages, among which it can be emphasized that the communications protocol that it uses is very inefficient when it needs to manage tasks which require a large amount of data transfer, such as the installation of large-sized applications.

SUMMARY OF EMBODIMENTS OF THE INVENTION

The above mentioned problems are addressed by means of a Servlet managed by a SCWS. This Servlet carries out substantially the same functions as a Toolkit application implementing remote application management. This is achieved by taking advantage of the connectivity facilities of the Servlets, which adds efficiency and performance to the services offered by an application for remote access management.

Additionally, the new approach manages to enhance the application layer "Global Platform ETSI TS 102 226—ETSI TS 131 116" implemented by means of a RAM, with a more efficient one, which takes advantage of the http or https protocol over TCP-IP.

Various embodiments are possible to carry out the foregoing, including systems and methods for managing information by a large capacity UICC. In one embodiment, a method is provided for exchanging information comprising dynamic contents through an internet type network between a large capacity universal integrated circuit card located within a mobile equipment and a remote device. The large capacity universal integrated circuit card comprises a smart card web server and has at least one servlet installed, wherein said smart card web server is configured for managing and controlling the execution of said servlet.

This method comprises the following steps: said servlet installed in said large capacity universal integrated circuit card implements a functionality of remote application management and processes commands configured for being used by said functionality of remote application management; exchanging said commands between said large capacity universal integrated circuit card and said remote device using an http-type protocol layer.

In a particular embodiment, the body of said http-type protocol layer comprises an ETSI TS 131 115 layer encapsulated therein, said ETSI TS 131 115 layer having in turn a global platform layer encapsulated therein, said global platform layer comprising the commands which said servlet is configured to process.

Alternatively, the body of said http-type protocol level comprises an enhanced global platform level, said enhanced global platform level comprising the commands which said servlet is configured to process, said enhanced global platform level permitting encapsulation of commands having size larger than 256 bytes. Preferably, said enhanced global platform level is encapsulated within an ETSI TS 131 115 layer in turn encapsulated within said body of said http-type protocol level.

The http-type protocol layer can be http or https.

The functionality of remote application management is preferably the RAM application as defined by ETSI standards "ETSI TS 102.226" and "ETSI TS 131 116".

In a particular embodiment, the http-type protocol layer is encapsulated within a TCP-IP layer, in turn encapsulated within a high speed protocol. This high speed protocol is preferably USB-IC.

In this embodiment, those commands are exchanged between said large capacity universal integrated circuit card and said remote device through a proxy located in said mobile equipment wherein said large capacity universal integrated circuit card is located, said proxy implementing a high speed protocol. Additionally, the method comprises the step of exchanging said commands between said proxy and said remote device through said internet type network.

In another particular embodiment, said http-type protocol layer is encapsulated at said large capacity universal integrated circuit card within a bearer independent protocol, in turn encapsulated within an ISO 7816 layer at said large capacity universal integrated circuit card.

In that case, said commands are preferably exchanged between said large capacity universal integrated circuit card and said remote device by mapping said bearer independent protocol into a TCT-IP layer at a gateway located within the mobile equipment within which said universal integrated circuit card is located.

In that case, the method further comprises the step of exchanging said TCT-IP frames between said mobile equipment and said remote device through an internet type network.

It is another aim of the present invention to provide a large capacity universal integrated circuit card comprising a smart card web server and at least one servlet, wherein said smart card web server is configured for managing controlling the execution of said servlet; wherein said servlet comprises means for implementing a functionality of remote application management and for generating commands for being used by said functionality of remote application management. Said functionality of remote application management is preferably the RAM application as defined by ETSI standards "ETSI TS 102.226" and "ETSI TS 131 116".

It is another aim of the present invention to provide a mobile equipment comprising a large capacity universal integrated circuit card as previously indicated.

It is another aim of the present invention to provide a system comprising at least one mobile equipment according to the previously indicated and at least one remote device, said at least one mobile equipment and said at least one remote device being connected through an internet type network.

It is a final aim of the present invention to provide a computer program comprising computer program code means adapted to perform the steps of the method previously indicated when said program is run on a smart card, a computer, a digital signal processor, a field-programmable gate array, an application-specific integrated circuit, a micro-processor, a micro-controller, or any other form of programmable hardware.

The advantages of the proposed invention will become apparent in the description that follows.

BRIEF DESCRIPTION OF THE DRAWINGS

To complete the description and in order to provide for a better understanding of the embodiments described here, a set of drawings is provided. Said drawings form an integral part of the description and illustrate a preferred embodiment of the invention, which should not be interpreted as restricting the scope of the invention, but just as an example of how the invention can be embodied. The drawings comprise the following figures.

DESCRIPTION OF PREFERRED
EMBODIMENTS OF THE INVENTION

In this text, the term "comprises" and its derivations (such as "comprising", etc.) should not be understood in an excluding sense, that is, these terms should not be interpreted as excluding the possibility that what is described and defined may include further elements, steps, etc.

Figure 5:
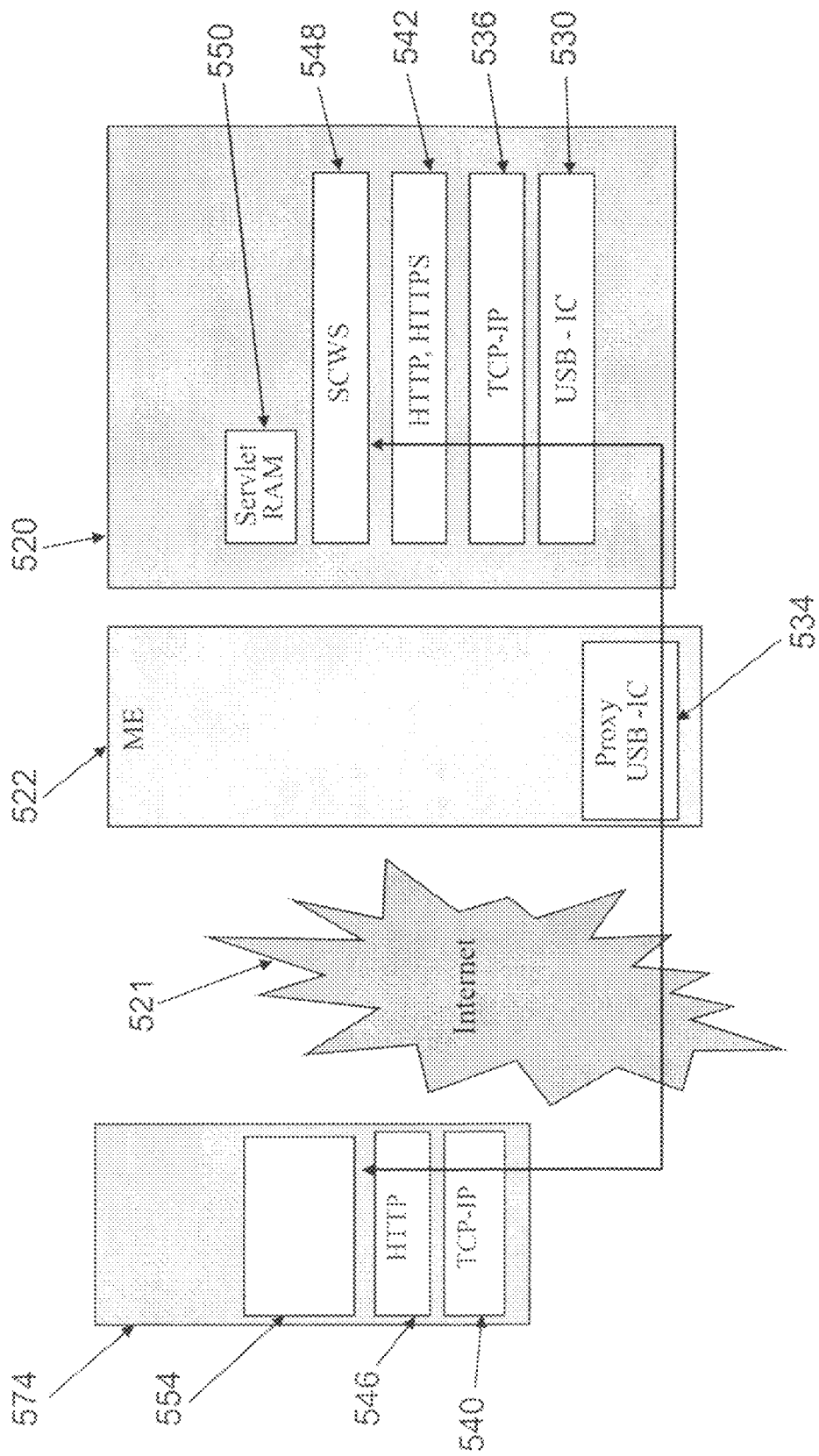
FIG. 5 shows how a RAM functionality is implemented by means of a Servlet, the management and execution control of which is done by the SCWS. The information is transmitted using a high speed protocol.

The implementation of various embodiments of the present invention can be carried out as follows:

In FIG. 5 three physical entities are represented: a mobile equipment or mobile terminal 522, a large capacity UICC or MegaSIM card 520 located within said mobile equipment 522 and a operation center 574 of a Mobile Network Operator (MNO). The operation center 574 is configured for exchanging information with said large capacity UICC 520 through the internet 521. Non-limiting examples of mobile networks over which Mobile Networks operators can operate are GSM, UMTS, CDMA and IMS.

FIG. 5 shows how a remote application management functionality is implemented by means of a Servlet 550, the management and execution control of which is done by the SCWS 548.

Preferably, said remote application management functionality is the RAM application as defined by ETSI standards "ETSI TS 102 226" and "ETSI TS 131 116".

FIG. 5 shows how from the operation center 574 of a Mobile Network Operator (MNO), by means of a web browser 554, a communication with a servlet 550 which carries out a remote application management functionality within the MegaSIM card 520 is established according to an embodiment of the present invention. Preferably, this remote application management functionality is the RAM application as defined by defined by ETSI standards "ETSI TS 102 226" and "ETSI TS 131 116". The RAM servlet 550 is located within the large capacity UICC 520, in a similar way as other functionalities which provide other services offered by the SCWS 548. The layers of the communications protocol comprise a http or https layer 542 546 over a TCP-IP layer 536 540 implemented both at the MegaSIM card 520 and at the operation center 574. The TCP-IP frames originated at the operation center 574 are received by the mobile equipment 522, which acts as Proxy 534, and inserts the TCP-IP frames within a layer corresponding to a standard high speed protocol Non-limiting examples of such high speed protocols are USB-IC, MMC, SD and others. Preferably, the high speed protocol used is USB-IC. In such case, the Proxy 534 is a Proxy USB-IC. These encapsulated TCP-IP frames are received by a corresponding standard protocol of serial communication layer 530—USB-IC in a preferred embodiment- within the MegaSIM card 530 (large capacity UICC).

Figure 6:
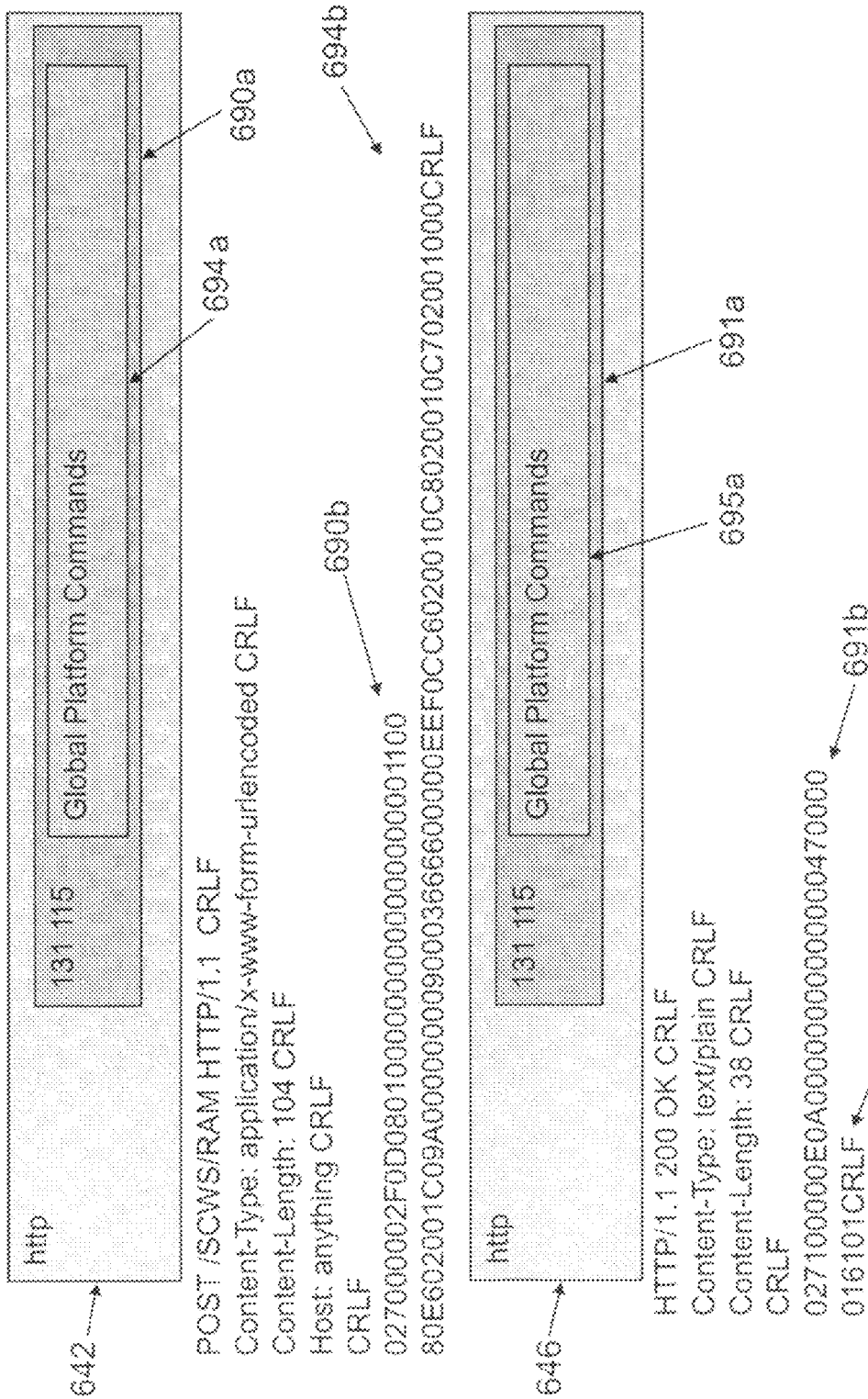
FIG. 6 represents an exemplary embodiment which shows how the commands "Global Platform" can be encapsulated within an http frame.

FIG. 6 represents an exemplary embodiment which shows how the commands "Global Platform" can be encapsulated within an http frame 642 (request). The http command POST (POST/SCWS/RAM HTTP/1.1CRLF) is directed towards the Servlet RAM 550 within the SCWS 548 (FIG. 5): The SCWS 548 passes the Servlet RAM 550 the received http frames by means of an API defined by ETSI TS 102 588. As can be seen in FIG. 6, within the data of the http request, ETSI layers 131 115 (referred to as 690*a* 690*b*) and Global Platform (referred to as 694*a* 694*b*) are encapsulated. Layer 131 115 is the one which makes the communication between the web browser 554 and the RAM servlet 550 be secured.

FIG. 6 also shows an http frame 646 (response) generated at the servlet (FIG. 5). As can be seen in FIG. 6, within the data of the http response 646, layers 131 115 (referred to as 691*a* 691*b*) and Global Platform (referred to as 695*a* 695*b*) are encapsulated. Layer 131 115 (referred to as 691*a* 691*b*) is the one which makes the communication between the web browser 554 and the RAM servlet 550 be secured.

In the embodiment represented in FIG. 6, the maximum size (length) of each of the commands of the Global Platform protocol 694*a* 694*b* 695*a* 695*b* is 256 bytes (of data). As a consequence, in order to install large-sized applications, a plurality of http frames is required, each of them having very few application data (256 bytes). The protocol becomes thus very inefficient.

Figure 7:
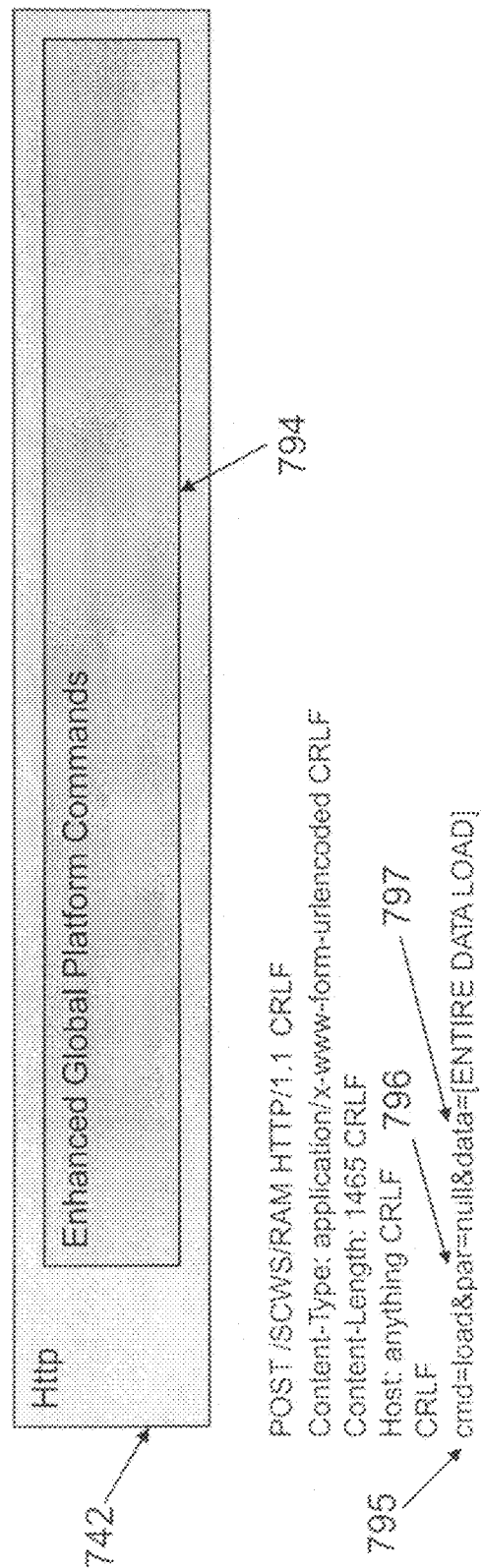
FIG. 7 represents an alternative embodiment which shows how "Global Platform" layer is improved.

FIG. 7 represents an alternative embodiment which shows how "Global Platform" layer 794 is improved in such a way that it permits encapsulation of commands having size larger than 256 bytes. These commands are directly encapsulated within the http frame 742. The http command POST (POST/SCWS/RAM HTTP/1.1 CRLF) is directed towards the Servlet RAM 550 within the SCWS 548 (FIG. 5). As can be seen in FIG. 7, the "Global Platform" commands comprise: a command identifier 795, before established by a class byte and an ins byte (this command identifier 795 refers to a single command which includes all the CAP files); a parameters identifier 796, before codified by bytes p1 and p2; and a data identifier 797, which comprises all the data needed by the command (entire load data).

Thanks to the improvement described with respect to FIG. 7, an efficient protocol is achieved. However, this embodiment can lack certain security, which can in turn be overcome by encapsulating a layer 131 115 (not illustrated in FIG. 7) within the http layer 742. The enhanced Global Platform layer 794 is in this case encapsulated within said layer 131 115. This way, efficiency is maintained while the security requirement which is normally applied to the conventional RAM application is also maintained. The frame corresponding to this situation is similar to the one represented in FIG. 6, with the difference that the regular Global Platform commands 694*a* 694*b* 695*a* 695*b* are substituted by the Enhanced Global Platform commands of FIG. 7. The Enhanced Global Platform commands 794 are thus encapsulated over layer 131 115.

Next, an alternative to this last embodiment is described where a ciphered channel can be applied in order to confer security to the protocol. Non-limiting examples of technologies which can be used for applying such ciphered channel are SSL and TLS. When http is used over TLS or SSL, the resulting secured channel offers authentication and confidentiality to the applications that run over http, in which case the http protocol is called https.

Figure 1:
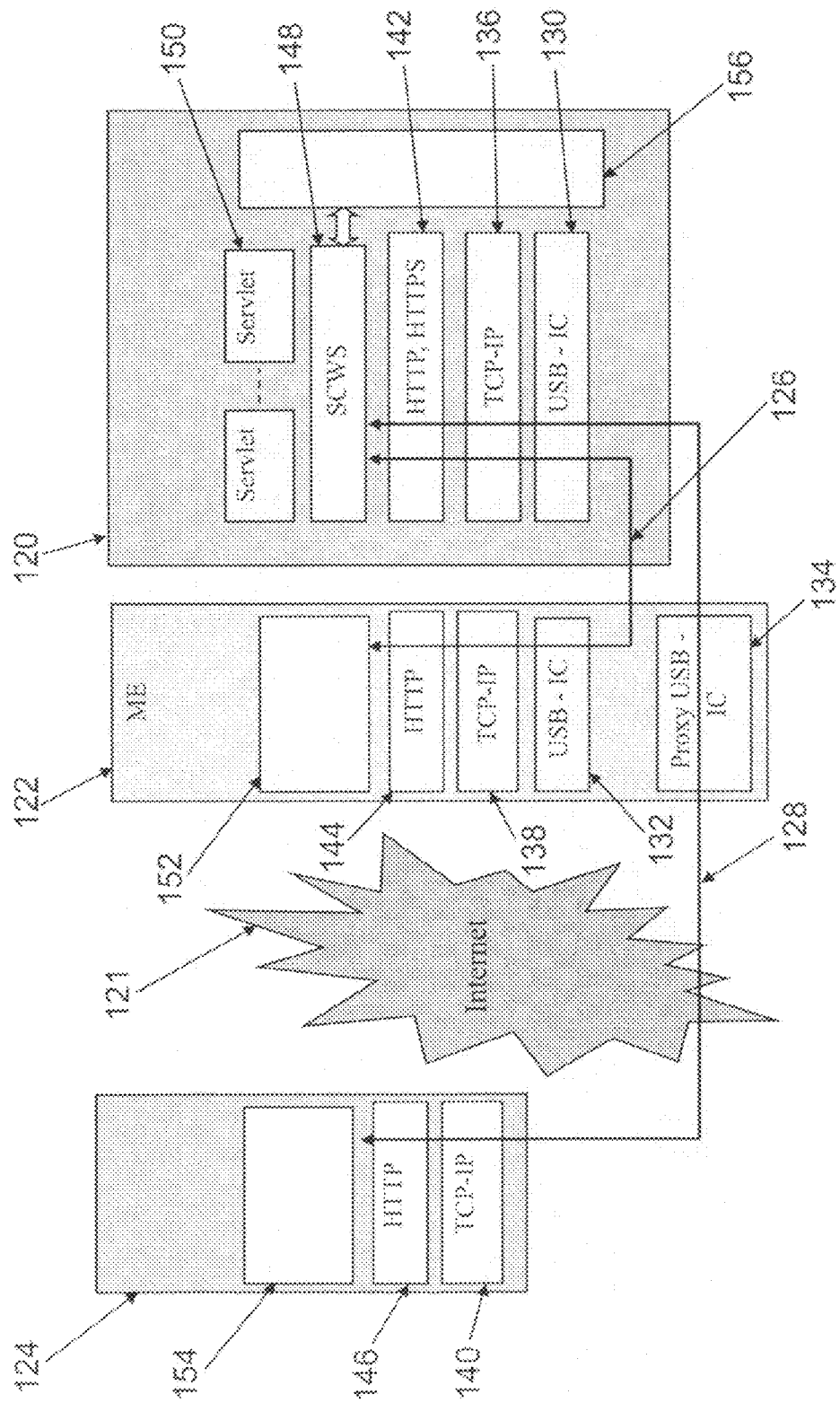
FIG. 1 represents the well-known architecture of the SOWS and the different communications protocols used in order to serve Internet browsers.
Figure 2:
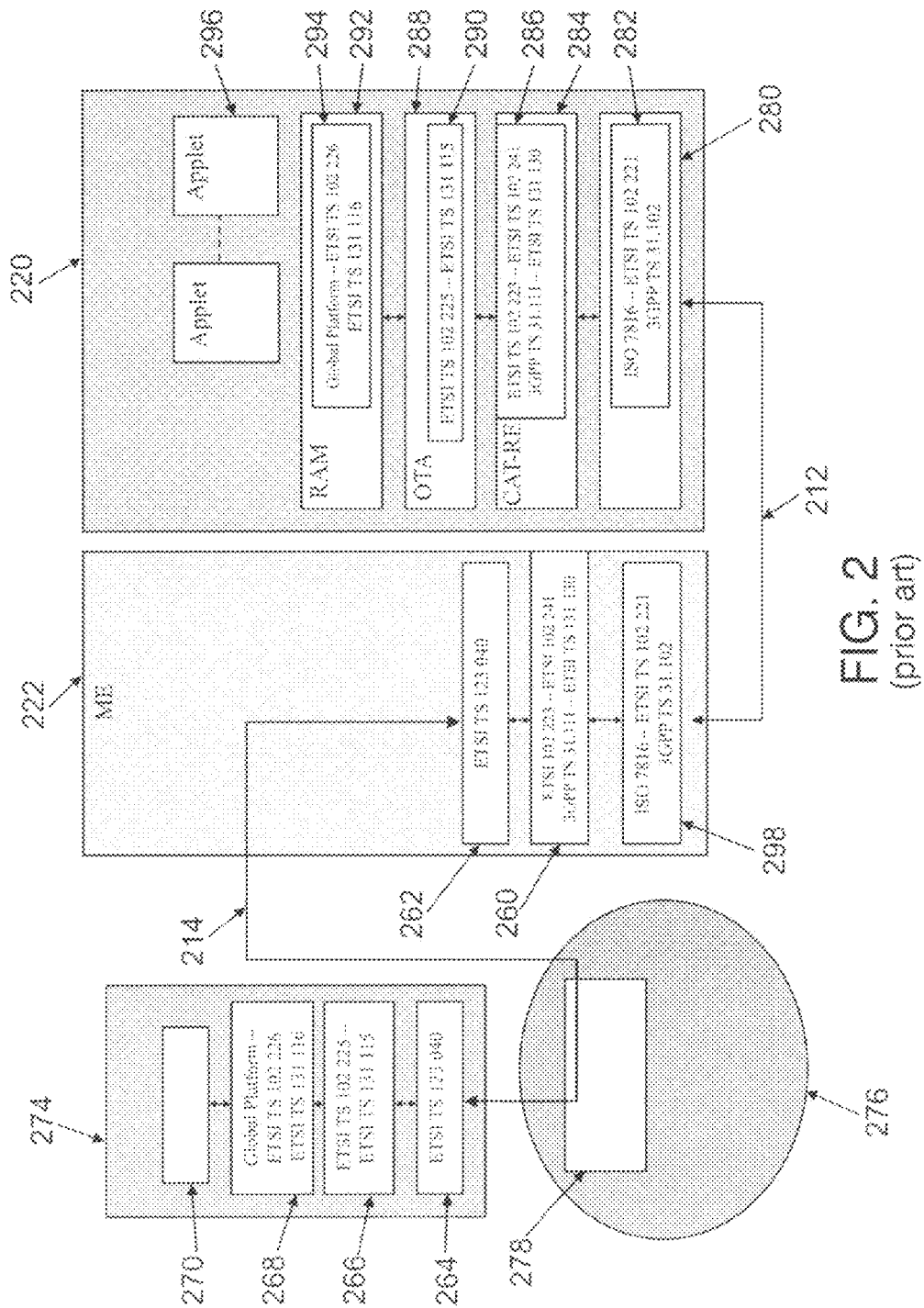
FIG. 2 shows how the RAM is supported on the protocol stack of a large capacity UICC and how it communicates with an application located within a Mobile Network Operator (MNO).
Figure 3:
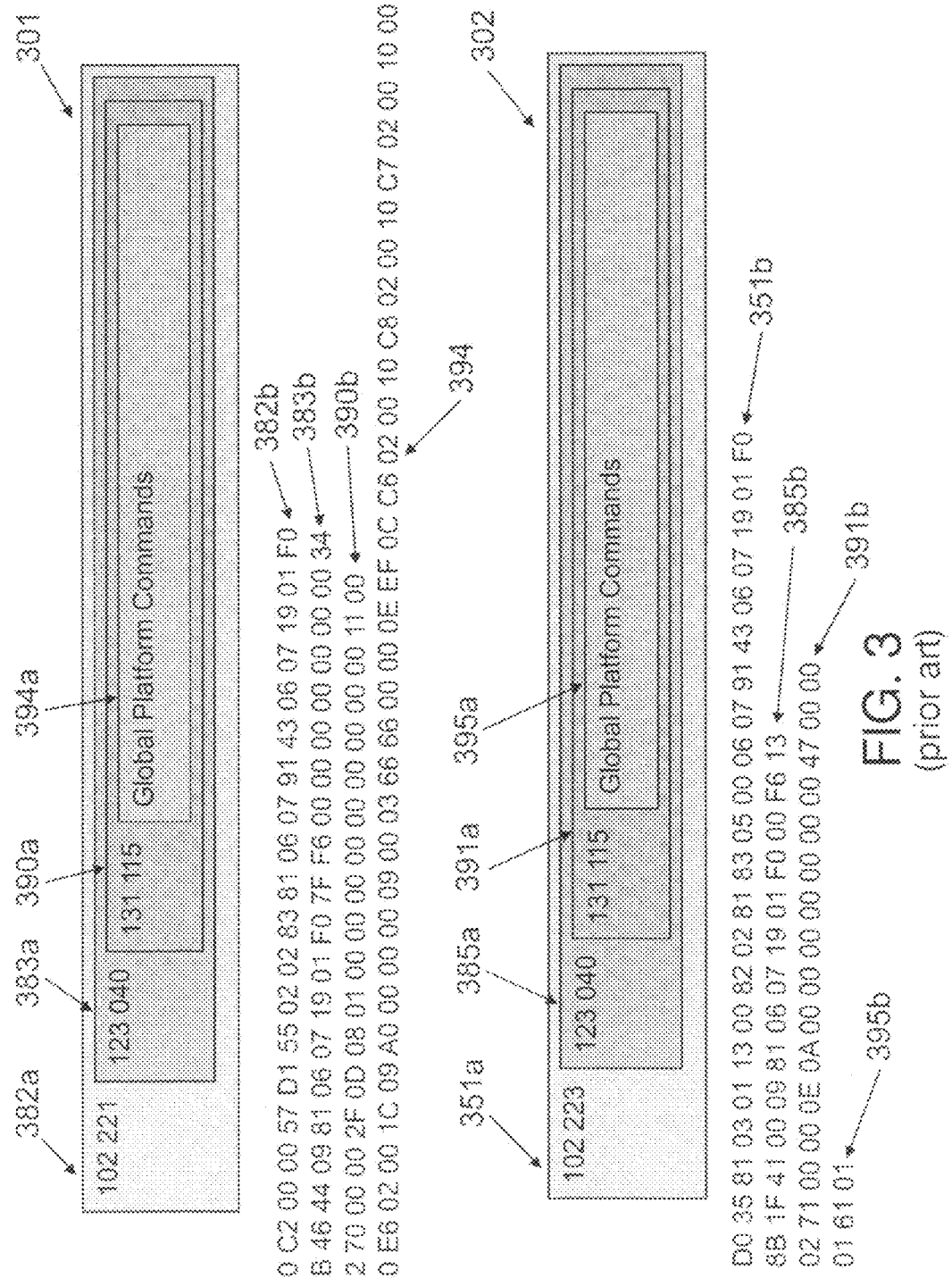
FIG. 3 shows a first frame received by the large capacity UICC of FIG. 2 and second frame generated by said large capacity UICC.
Figure 4:
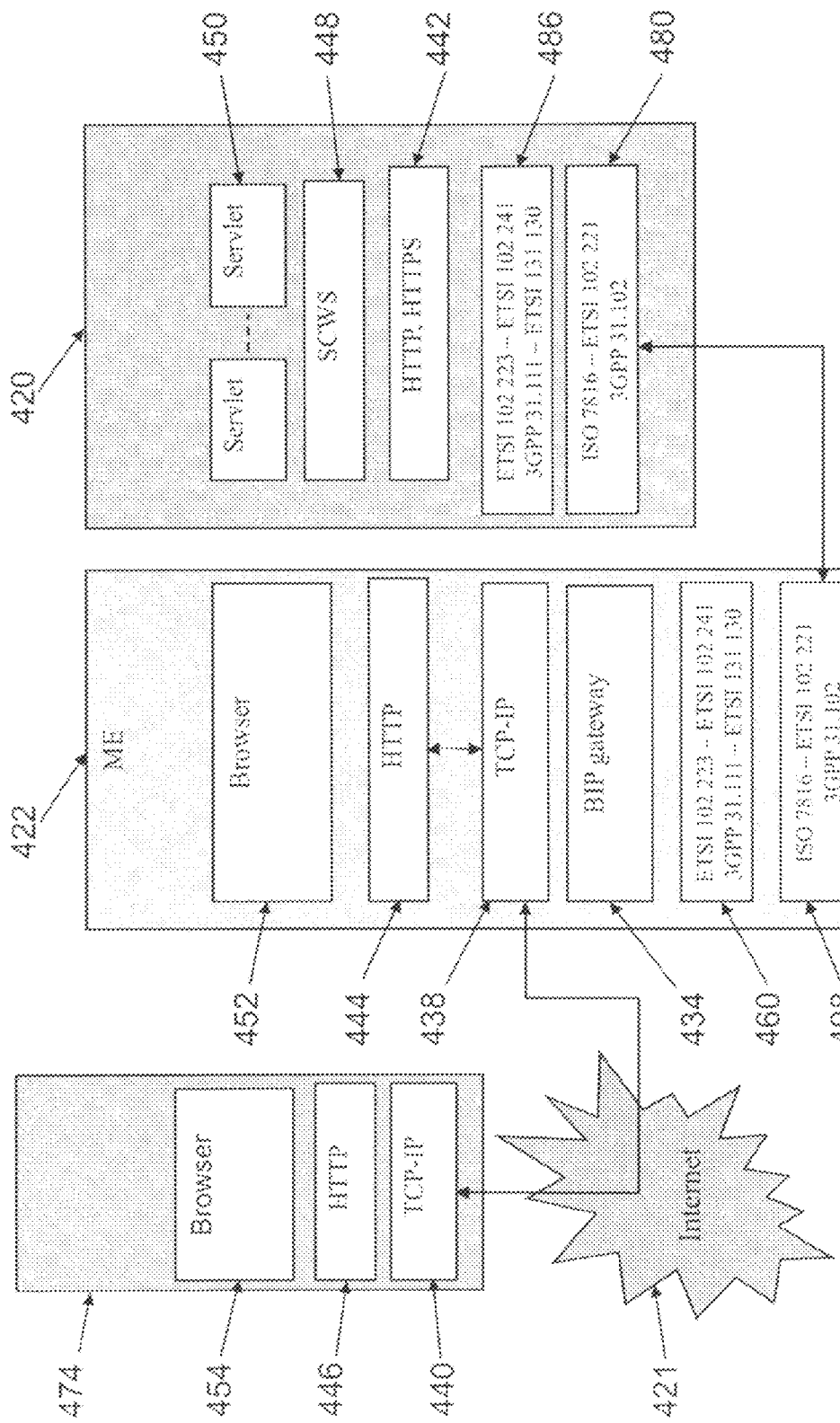
FIG. 4 shows the architecture of the SCWS and the different communications protocols based on the Bearer Independent Protocol (BIP) used in order to serve Internet browsers.
Figure 8:
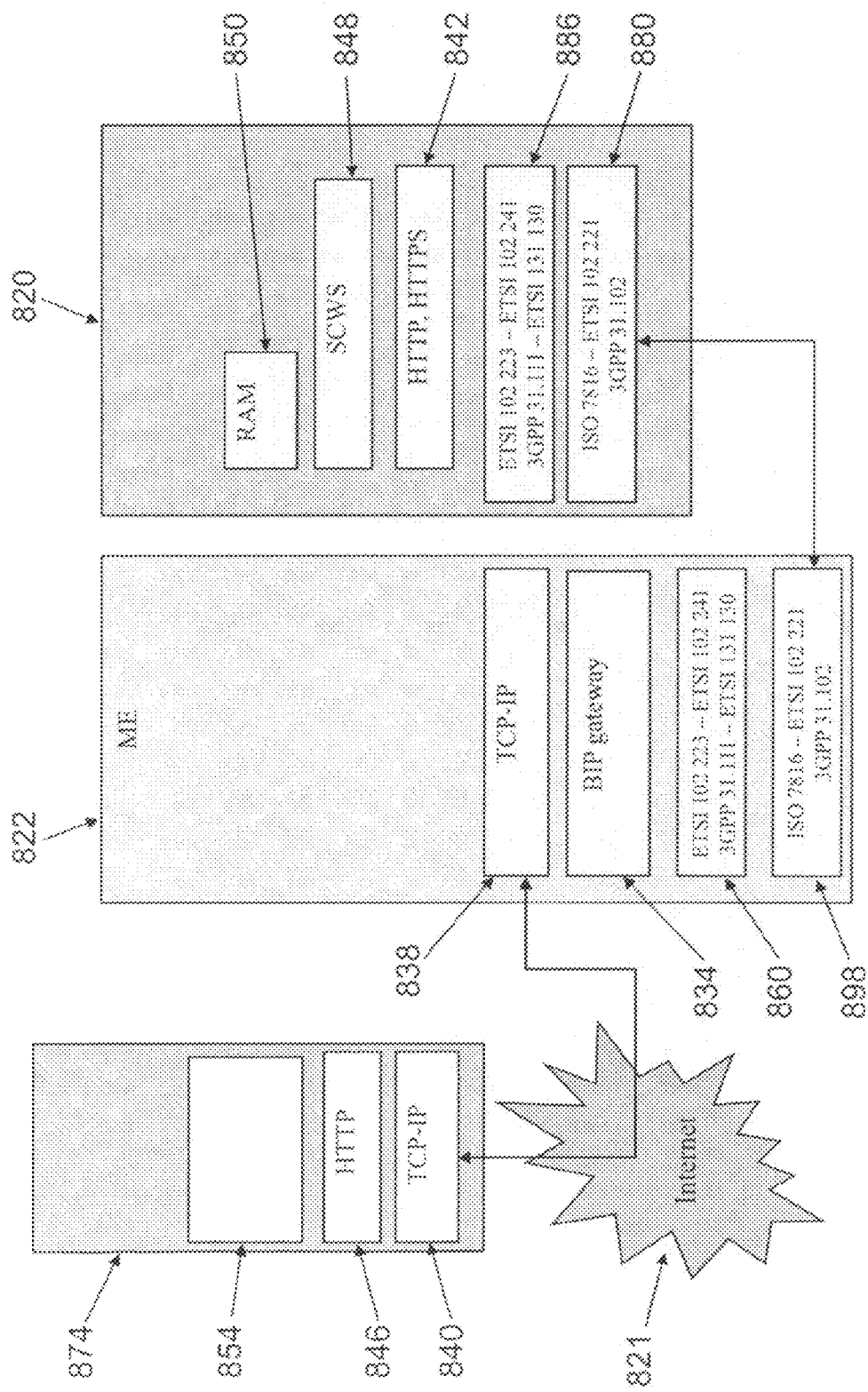
FIG. 8 shows an alternative embodiment in which a RAM functionality is also implemented by means of a Servlet, the management and execution control of which is also done by the SCWS. In this case, the information is transmitted using a Bearer Independent protocol.

FIG. 8 illustrates an alternative embodiment to the implementation of FIG. 5 and is based on the protocol stacks of FIG. 4. It shows a scenario wherein a remote application (i.e. a browser) 854 establishes a communication with a RAM 850 located within a large capacity UICC 820 that is in turn located within a mobile equipment 822, in order to manage some content on the large capacity UICC 820. Any data from the incoming TCP/IP packet 840 (originated at a remote device 874 with a destination of the loop-back address, i.e., dynamic address given by the Mobile Network Operator (MNO)) is translated to the BIP Protocol by a BIP gateway 834 located within the mobile equipment 822. The large capacity UICC 820 receives the data using the BIP protocol. This data is formatted according to the http or https protocol 842 846. Then, like in the previous embodiment, the SCWS 848 renders the http or https protocol 842 and triggers the RAM Servlet 850, that executes the commands to manage the large capacity IUCC content. As explained with reference to FIG. 4, a protocol stack comprising an http or https layer 842 is mounted over an entity 886 which implements the protocols layer "ETSI TS 102 223" "ETSI TS 102 241" "3GPP TS 31.111" and "ETSI TS 131 130". They communicate with the corresponding protocols layer 860 "ETSI TS 102 223" "ETSI TS 102 241" "3GPP TS 31.111" and "ETSI TS 131 130" of the mobile equipment 822 within which the large capacity UICC 820 is located. This layer defines the protocol which allows the communication of the Toolkit applications which can be found in the large capacity UICC 820 with external or remote applications and devices. This layer lays over an entity 880 898 which supports ISO 7816, ETSI TS 102 221 and 3GPP TS 31.102.

The encapsulation of the commands of the Global Platform and of the enhanced Global Platform within an http-type frame illustrated in FIGS. 6 and 7 respectively also applies to the embodiment of FIG. 8.

In summary, systems and methods implemented as described above provide a Servlet managed by the SCWS. This Servlet carries out the same functions as the ToolKit application RAM. This is achieved by taking advantage of the connectivity facilities of the Servlets, which provides the services offered by application RAM with better efficiency and performance.

Additionally, this approach manages to improve the application layer "Global Platform ETSI 102226—ETSI 131116" implemented by means of a remote application management functionality, taking advantage of the http or https protocol over TCP-IP.

The various embodiments of the invention are obviously not limited to the specific embodiments described herein, but also encompasses any variations that may be considered by any person skilled in the art (for example, as regards the choice of components, configuration, etc.), within the general scope of the invention as defined in the appended claims.

The invention claimed is:

1. A method of exchanging information comprising dynamic contents through an internet type network between a large capacity universal integrated circuit card located within a mobile equipment and a remote device,
   the large capacity universal integrated circuit card comprising a smart card web server and having at least one servlet installed, wherein the smart card web server is configured for managing and controlling the execution of the servlet;
   wherein the method comprises:
      with the servlet installed in the large capacity universal integrated circuit card implements, implementing a functionality of a remote application management and processing commands configured for being used by the functionality of the remote application management; and
      exchanging the commands between the large capacity universal integrated circuit card and the remote device using an http-type protocol layer;
   wherein the body of the http-type protocol layer comprises an enhanced global platform layer, the enhanced global platform layer comprising the commands which the servlet is configured to process, the enhanced global platform layer permitting encapsulation of commands having size larger than 256 bytes.

2. The method according to claim 1, wherein the body of the http-type protocol layer comprises an ETSI layer encapsulated therein, the ETSI layer having in turn a global platform layer encapsulated therein, the global platform layer comprising the commands which the servlet is configured to process, the ETSI layer being compliant with standard ETSI TS 131 115 V7.1.0 dated June 2007.

3. The method according to claim 1, wherein the enhanced global platform layer is encapsulated within an ETSI layer in turn encapsulated within the body of the http-type protocol layer, the ETSI layer being compliant with standard ETSI TS 131 115 V7.1.0 dated June 2007.

4. The method according to claim 1, wherein the http-type protocol layer is http.

5. The method according to claim 1, wherein the http-type protocol layer is https.

6. The method according to claim 1, wherein the http-type protocol layer is encapsulated within a TCP-IP layer, which in turn is encapsulated within a high-speed protocol.

7. The method according to claim 6, wherein the high-speed protocol is USB-IC.

8. The method according to claim 6, wherein the commands are exchanged between the large capacity universal integrated circuit card and the remote device through a proxy located in the mobile equipment wherein the large capacity universal integrated circuit card is located, the proxy implementing a high-speed protocol.

9. The method according to claim 8, further comprising exchanging the commands between the proxy and the remote device through the internet type network.

10. The method according to claim 1, wherein the http-type protocol layer is encapsulated at large capacity universal integrated circuit card within a bearer independent protocol, in turn encapsulated within an ISO layer at the large capacity universal integrated circuit card, the ISO layer being compliant with standard ISO 7816 before Dec. 28, 2007.

11. The method according to claim 1, wherein the commands are exchanged between the large capacity universal integrated circuit card and the remote device by mapping the bearer independent protocol into a TCT-IP layer at a gateway located within the mobile equipment within which the universal integrated circuit card is located.

12. The method according to claim 11, further comprising exchanging the TCT-IP frames between the mobile equipment and the remote device through an internet type network.

13. The method according to claim 1, wherein the functionality of the remote application management is the RAM application as defined by standard ETSI TS 102.226 V7.5.0 dated October 2007 and standard ETSI TS 131 116 V7.0.0 dated June 2007.

14. A large capacity universal integrated circuit card comprising:
   a smart card web server; and
   at least one servlet;
   wherein the smart card web server is configured for managing and controlling the execution of the servlet, and
   wherein the servlet is configured for implementing a functionality of a remote application management and for generating commands for being used by the functionality of the remote application management and processing commands configured for being used by the functionality of the remote application management; and
   exchanging the commands between the large capacity universal integrated circuit card and the remote device using an http-type protocol layer;
   wherein the body of the http-type protocol layer comprises an enhanced global platform layer, the enhanced global platform layer comprising the commands which the servlet is configured to process, the enhanced global platform layer permitting encapsulation of commands having size larger than 256 bytes.

15. The large capacity universal integrated circuit card according to claim 14, wherein the functionality of the remote application management is the RAM application as defined by standard ETSI TS 102.226 V7.5.0 dated October 2007 and standard ETSI TS 131 116 V7.0.0 dated June 2007.

* * * * *